United States Patent [19]
Berlincourt et al.

[11] Patent Number: 4,802,510
[45] Date of Patent: Feb. 7, 1989

[54] HIGH-PRESSURE HOSE AND A PROCESS FOR ITS PRODUCTION

[75] Inventors: Yves Berlincourt, Blois; Alain Mouchot, Cheverny, both of France

[73] Assignee: Tecalemit Flexibles S.A., Blois Cedex, France

[21] Appl. No.: 38,884

[22] Filed: Apr. 14, 1987

[30] Foreign Application Priority Data

Apr. 18, 1986 [FR] France .................................. 8605629

[51] Int. Cl.⁴ ............................................. F16L 11/10
[52] U.S. Cl. ..................................... 138/125; 138/153
[58] Field of Search ................. 87/6, 9; 138/124, 125, 138/126, 127, 153

[56] References Cited

U.S. PATENT DOCUMENTS

| | | | |
|---|---|---|---|
| 3,245,431 | 4/1966 | Coe | 138/125 |
| 3,463,197 | 8/1969 | Slade | 138/125 |
| 3,918,499 | 11/1975 | Higbee | 138/125 |
| 4,585,035 | 4/1986 | Piccoli | 138/125 X |

*Primary Examiner*—Werner H. Schroeder
*Attorney, Agent, or Firm*—Mason, Fenwick & Lawrence

[57] ABSTRACT

The invention relates to a hose comprising an inner plastics tube (2) covered by at least one braiding of filaments disposed in helically crossed layers (5, 6) around the inner tube (2), characterized in that the filaments (7) are made of plastics and are so deformed in their right cross-section that the gap (8) between any two adjacent layers (6a, 6b) which extend in the same direction as one another is at least 100% filled. The invention also relates to a process for the production of the hose.

15 Claims, 2 Drawing Sheets

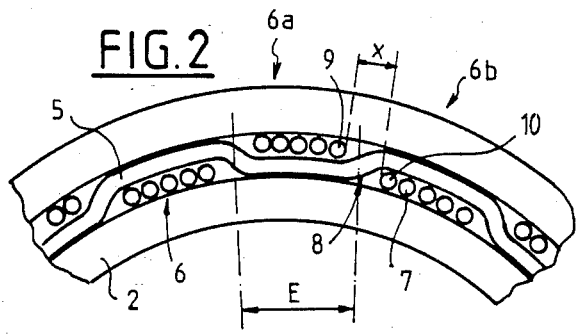
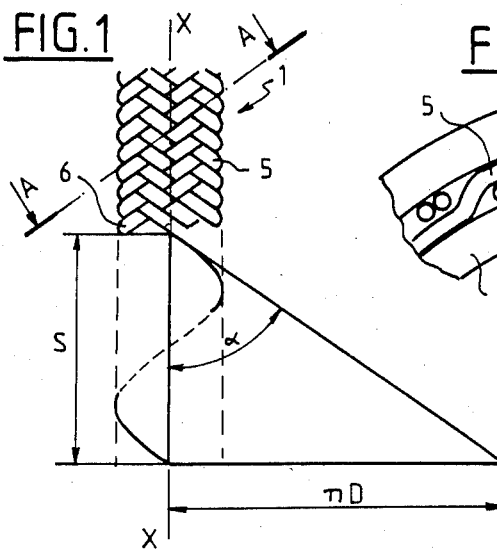
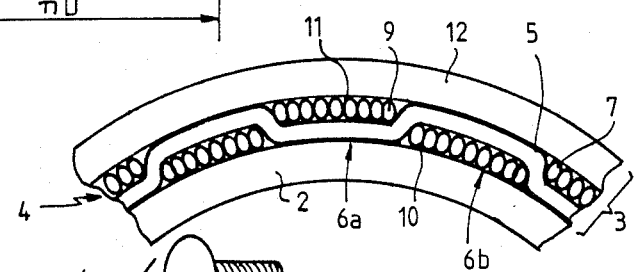
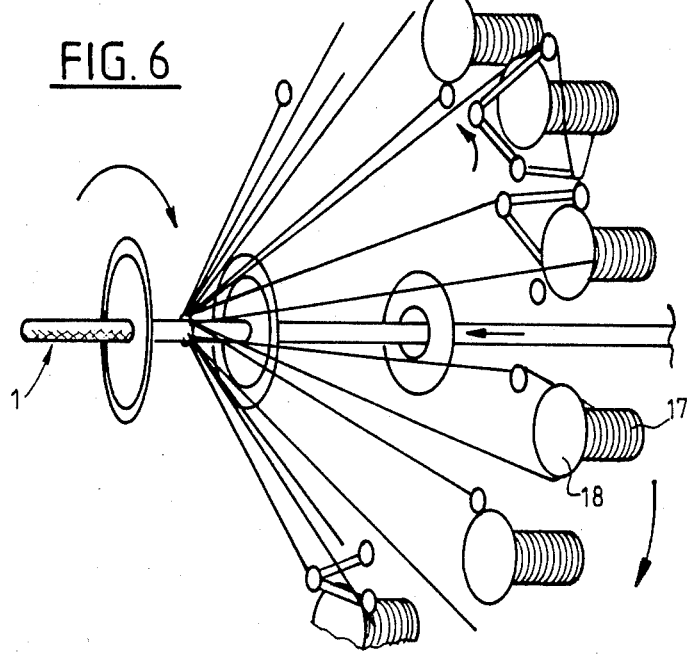
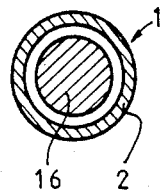

HIGH-PRESSURE HOSE AND A PROCESS FOR ITS PRODUCTION

This invention relates to a novel very high-pressure hose with high dynamic endurance, the hose being strengthened by synthetic fibre filaments and being of use to carry inter alia fuels, gases and hydraulic fluids.

High-pressure hoses comprising a tube covered by an axial outer cylindrical element produced by braiding a number of filaments are known. Each set of filaments is wound spirally on the tube. For example, metal wires having a diameter of from 0.3 to 0.6 mm are used for braiding. However, the wires, since they are placed spirally on the tube by braiding, experience alternate bending when used at very high pressure and this alternate bending may break the wires. Also, since braiding bends the wires, with the possible result of them breaking and of the inner tube being perforated, it is preferred to layer filaments placed one above another.

To ensure that the hose is strong enough to carry high-pressure fluids, endeavours have been made to minimise the gap in the braided element between the layers of braided metal wires. Layers of coplanar steel wires do not allow adequate filling and holes and voids remain between two contiguous layers, with the result that the hose has less strength to withstand high pressures. Improvements have been made to the conventional braiding of steel wires in coplanar layers and groups of non-coplanar fine wires have been braided to provide better filling (French patent specification No. 1 522 053). Unfortunately, the resulting hoses are heavy since the amount of material placed on the central tube is greater when groups of fine wires are braided than when layers of wires are braided.

It is the object of the invention to obviate these disadvantages.

It is a first object of the invention to provide hoses comprising a central tube covered by braided synthetic fibre filaments, the braiding providing a gapless covering surface and thus making it possible to provide the hose with very good high-pressure strength.

It is a second object of the invention to provide hoses having a long working life in respect of mechanical stresses and without any limitation of the materials used for the hoses.

It is a third object of the invention to provide hoses which for a given strength are lighter than the known hoses and which are not fatigued by alternate bending and which withstand corrosion, abrasion, heat, chemical agents and ultraviolet radiation.

The invention accordingly relates to a hose comprising an inner plastics tube covered by a braiding of filaments disposed in helically crossed layers around the inner tube, the hose being such that the filaments are made of plastics and are so deformed in their right cross-section that the gap between any two adjacent layers which extend in the same direction as one another is at least 100% filled.

Preferably, the plastics is aromatic polyamide such as KEVLAR or TWARON, the registered trade marks of the the Du Pont de Nemours and Euha companies respectively.

The invention also relates to a process for producing such a hose.

The following description taken together with the accompanying exemplary non-limitative drawings will show how this invention can be carried into effect. In the drawings:

FIG. 1 is an elevation of a piece of hose according to the invention;

FIG. 2 is a partial view to an enlarged scale and in inclined section of a prior art hose;

FIG. 3 is a partial view to an enlarged scale, in section on the line A—A of FIG. 1, of a first embodiment of a hose according to the invention;

FIG. 5 is a view in right cross-section of a hose according to the invention during its production, and FIG. 6 is a diagrammatic view of the apparatus for the practice of the process for manufacturing a hose according to the invention.

Figure 4:
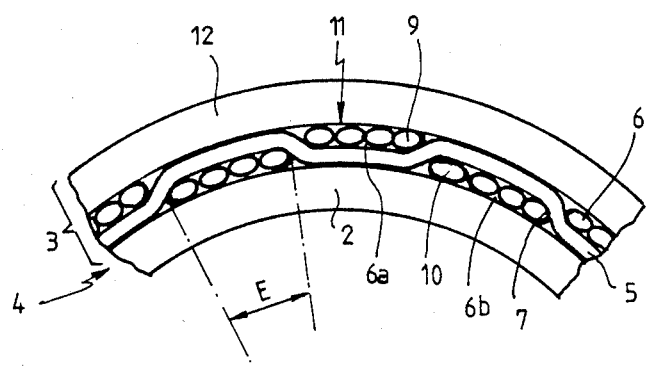
FIG. 4 is a partial view to an enlarged scale along the line A—A of FIG. 1 of a second embodiment of a hose according to the invention.

A hose 1 according to the invention comprises at least one inner tube 2 and an outer member 3 embodied by braided filaments. Each braiding 4 is embodied by layers 5 of helically wound filaments which cross helically wound layers 6, the layers 5, 6 making the same angle $a$, called the braiding angle, with longitudinal axis X—X of the hose 1. If D denotes the braiding diameter (defined as the average diameter of the braiding or diameter of the neutral fibre) and S denotes the length of the pitch, then:

$$lg\, a = \frac{\pi D}{S}$$

Also, if E denotes the width of a gap 11 for a layer 5 or 6 between two crossings with another layer 6 or 5 and N denotes the total number of layers 5, 6 wound around the tube 2, then:

$$E = \frac{2\pi D \cos a}{N}$$

In the prior art metal wires 7 (FIG. 2), for example, of steel, are used—i.e., the wires are incompressible and the right cross-section thereof is and remains circular. The metal wires 7 of a layer 5 when placed one beside another in the same layer cannot completely fill the gap E left by the inversely braided layer 6. Consequently, if each layer 5, 6 consists of wires disposed parallel to one another and one beside another, there always exists a gap 8, of a width x called the clearance, which is necessary for the flexibility of the hose when metal wires are used, between the last wire 9 of a layer 6a and the first—i.e., nearest—wire 10 of the adjacent layer 6b which extends in the same direction. The inner tube 2 is therefore less strengthened, or fragilized, near the gap 8.

The invention therefore resides in obviating the gaps 8 between two layers 6, 6b of filaments which are adjacent with one another and which extend in the same direction as one another but without making the hose rigid.

The invention therefore proposes a hose embodied by a plastics inner tube 2 covered by at least one braiding of filaments disposed in layers 5, 6 crossed helically around the inner tube 2 wherein the filaments 7 are made of plastics and are so deformed in their right cross-section that the gap 8 between any two adjacent layers 6a, 6b which extend in the same direction as one another is at least 100% filled. At least 100% filled-means that the volume of the filaments constituting the layer when they are standing by is equal or superior to the volume of the annular sheet they will finally constitute when they are braided on the inner tube. The deformation by compression of the filaments permits to get this feature.

In the first embodiment, shown in FIG. 3, the number $n$ of filaments per layer 5, 6, the number $N$ of layers 5, 6 around the inner tube 2, the filament gauge $t$ and the tension $T$ with which they are laid are such that the width $E$ of the gap 11 for a layer 5, 6 of $n$ filaments 7 is less than the space normally required thereby, the filaments being disposed one beside another, squeezed against one another and flattened substantially tangentially of the inner tube (2).

The point is that the gauge $t$ corresponds to an average diameter $d$ of the filaments 7 and, if the filaments 7 are assumed to be non-deformable and of circular cross section, then:

$$x = E - nd$$

In this first embodiment of the invention, $n$, $N$ and $t$ (and therefore $d$) are so chosen that $$E - nd < 0.$$

The tension $T$ is therefore adapted to produce the distortion of the filament 7 and their arrangement one beside another as shown in FIG. 3 while obviating any placing of the filaments one above another.

In the second embodiment of the invention, shown in FIG. 4, the number $n$ of filaments 7 per layer 5, 6, the number $N$ of layers 5,6 around the inner tube 2, the filament gauge $t$ and the tension $T$ with which they are laid are such that the width $E$ of the gap 11 for a layer 5, 6 of $n$ filaments 7 is greater than the space required thereby, the filaments being flattened substantially radially of the inner tube 2 to completely fill the gap 11 and the gap 8 between any two adjacent layers 6a, 6b which extend in the same direction as one another.

In this second embodiment of the invention:

$$E - nd > 0.$$

However, the tension $T$ is sufficient to deform the filaments 7 and completely fill the gap 11.

In all cases each filament 7 has a right cross-section which is other than circular and which is flattened, being notably substantially elliptical.

A braiding 4 of a hose 1 according to the invention is embodied by filaments placed one beside another in layers but deformed transversely so that the last filament 9 of the layer 6a is beside—i.e., without any gap—the first filament 10 of the adjacent layer 6b which extends in the same direction as the layer 6a, although the layers extend in two different parallel planes, one such plane being above the filaments of the inversely braided layer 5 while the other plane is below the filaments thereof. The filaments 7 can be sufficiently deformed for the last filament 9 of a layer to be placed substantially above the first filament 10 of the next layer. The gap between two layers is therefore more than 100% filled.

The first embodiment of the invention is well suited to hoses having a relatively large diameter $D$ of, for example, more than 10 mm and having a substantial number $n$ of filaments 7 per layer, for example, having more than four filaments and possibly, conventionally, as many as twelve.

However, the second embodiment of the invention is better suited to hoses having a relatively reduced diameter $D$ of, for example, less than 10 mm and having a smaller number $n$ of filaments 7 per layer, for example, at most four filaments per layer.

The filaments 7 which form at least the inner braiding 4 in engagement with the inner tube 2 are embodied by synthetic fibres, the filaments being twisted so that the fibres acquire after spinning a high breaking strength. As a rule, the maximum breaking strength of a steel wire of from 0.3 to 0.6 mm in diameter is between 245 and 275 da N/mm². According to the invention, filaments of twisted synthetic fibres, inter alia with a twist 80$s$ of 80 turns per meter run, and having for the same diameter a breaking strength of the order of 280 da N/mm² are used.

The synthetic fibres are preferably aromatic polyamide fibres having a high elasticity modulus, such as KEVLAR, a registered trade mark of Du Pont de Nemours or TWARON, a registered trade mark of Enka. The fibres used for the filaments 7 are, with advantage, impregnated with a fluorinated polymer operative for chemical and mechanical bonding of the fibres.

The hose 1 according to the invention can be embodied by a hollow inner tube 2 made of polytetrafluoroethylene which may or may not be internally lined with a carbon layer in order to be electrically conductive or not.

Preferably, the hose according to the invention comprises at least one braiding 4 of filaments 7 and means 12 for protecting the braiding 4 against external stressing including mechanical, heat, chemical and radiation stressing.

In a first possible variant, the protective means 12 comprise a plastics sheathing, inter alia of synthetic fluorinated polymer, covering the or each braiding 4. Sheathing of this kind is completely hermetic.

In a second possible variant, the means 12 comprise an outer protective braiding around the or each reinforcing braiding 4. The outer protective braiding 12 is made of highly abrasion-resistant plastics operative as heat insulant and unaffected by ultraviolet radiation, inter alia of aromatic polyamide such as NOMEX, a registered trade mark of Du Pont de Nemours, which has a dark or reflecting colour for better ultraviolet protection. A substance such as NOMEX provides excellent fire protection and withstands temperatures up to 200° C. Also, it is very light and flexible. Advantageously, the outer protective braiding 12 has the same features as the strengthening braiding 4—i.e., the filaments are transversely deformed to completely fill the gap between two adjacent layers which extend in the same direction as one another.

In a third possible variant, the hose 1 comprises only one braiding 4 of filaments 7 and the same are embodied by or covered by a substance treated to withstand external stressing to form protective means 12.

Preferably, the filaments 7 of the outer braiding 4 or 12 are embodied by or covered by a non-wetting substance.

Only a single strengthening braiding 4 is provided in such embodiments of the invention as are illustrated. However, a number of identical braidings 4 can be arranged one above another and each covered by protective means 12. For instance, two identical braidings 4 can be provided one above another, the braiding angles being very close to one another at 54° and 55° respectively.

The invention also proposes a process for the production of a hose 1 comprising an inner plastics tube 2 and at least one braiding 4 of filaments 7 wound in layers 5, 6 helically around the inner tube 2, characterised in that the layers 5, 6 of plastics filaments 7 are braided: by the filaments 7 being stretched enough to deform their right cross-section and to position them side by side in the same layer, adjacent layers 6a, 6b which extend in the same direction as one another being positioned without tangential clearance.

In a production process according to the invention, the layered filaments 7 are first wound on reels 17, whereafter the inner tube 2 is threaded on to a former 16, whereafter the filaments 7 are braided or stranded by means of the braiding or stranding device shown in FIG. 6 where the braiding reels 17 containing the layered filaments 7 are disposed.

In a process according to the invention, therefore, the following steps are carried out:

(a) Filaments 7 made of synthetic fibres are first wound on reels 7, the filaments being disposed one beside another in layers on each reel;

(b) The inner tube 2 is threaded onto a mandrel;

(c) The filaments 7 are braided by so adjusting their tension as to stretch them and deform their cross-section;

(d) The filaments 7 are so braided that each last filament 9 of a layer 6a is positioned beside the first filament 10 of the immediately adjacent layer 6b which extends in the same direction.

To produce a hose 1 of the first embodiment shown in FIG. 3, the number N of braiding reels 17 of the braiding or standing apparatus (which corresponds to the number N of layers 5, 6 forming the braiding 4 around the inner tube 2), the number n or filaments 7 per layer 5, 6, the filament gauge t and the tension T with which the filaments 7 are braided are so chosen that the width E of the gap 11 for a braided layer is less than the space normally required by the n filaments 7 of the layer 5, 6, the n filaments remaining one beside another during braiding, being squeezed together and flattened substantially tangentially of the inner tube 2.

To produce a hose 1 of the second embodiment shown in FIG. 4, the number N of braiding reels (and hence the number of layers 5, 6 forming the braiding 4 around the inner tube 2), the number n of filaments 7 per layer 5, 6, the filament gauge t and the tension T with which the filaments 7 are braided are so chosen that the width E of the gap 11 for a braided layer is greater than the space normally required by the n filaments 7 of the layer 5, 6, the n filaments 7 remaining one beside another during braiding and being flattened substantially radially of the inner tube 2 to completely fill the gap 11 left for the n filaments 7 and the gap 8 between any two adjacent layers 6a, 6b which extend in the same direction as one another.

Preferably, the step of winding the layered filaments 7 on the reels 17 is carried out after spinning and after the filaments 7 have been given a type S twisting inter alia of 80 turns per meter run.

In the reeling operation the filament layer 7 are reeled on reels 17 having end plates 18 operative to retain the filaments 7 when they experience elevated tension during the subsequent braiding step.

The filaments 7 experience an elevated tension T, possibly of the order of from 9 to 14 da N, during braiding. The tension T is sufficient to lock the inner tube 2 by mechanical seizure. The braiding filaments 7 are encrusted in the outside surface of the inner tube 2. Preferably, the inner diameter of the inner tube 2 is greater than the diameter of the former 16 so that the braiding applies the tube 2 to the former 16. With an elevated tension T the variation in hose length under stressing including pressure, temperature and bending can be reduced considerably, so that there is less disturbance in the hydraulic circuit and the connection of the union to the hose is stronger.

Before reeling the filaments are impregnated with a fluorinated polymer by being dipped in a bath during the twisting operation.

The inner tube 2 can also be lined with a number of braids 4 disposed one above another with very similar braiding angles close to the theoretical braiding angle of 54°44′. Preferably, a first braiding is made with a braiding angle of 54°, whereafter a second braiding is made with a braiding angle of 55°.

If the filaments 7 have not themselves been previously protected, a protective covering 12 is placed on the or each braiding after the braiding step. The covering 12 is either an extruded sheath, for example, of fluorinated synthetic polymer or a further braiding of a different material from the strengthening braidings 4, for example, of coloured NOMEX.

EXLAMPLE 1

A hose was made by braiding 3340 dtex filaments—i.e., filaments having an average diameter d of 0.47 mm—on an inner tube. The filaments were first wound in a layer of n=6 filaments and a braiding machine having N=36 reels was used. The inner tube diameter was such that the diameter D of the neutral fibre was 19.4 mm. The braiding angle α was 54°44′. The tension T was 14 daN.

EXAMPLE 2

A hose was made by braiding 3340 dtex filaments—i.e., filaments having an average diameter d of 0.47 mm—on an inner tube. The filaments were first wound in a layer of n=2 filaments and a braiding machine having N=24 reels was used. The inner tube diameter was such that the diameter D of the neutral fibre was 8.9 mm. The braiding angle α was 54°44′. The tension T was 10 daN.

The resulting hoses withstand temperatures in a range extending from −55° C. to +180° C. and are unaffected by oils, air and fuel, for example, at 180° C. for 7 days.

When pressure tested at from 280 to 420 bar—i.e., at 50% overpressure—variation in hose length was at most 2%.

We claim:

1. A flexible hose comprising an inner plastic tube covered by at least one braiding constituted of a plurality of helically crossed layers braided in two different directions around the inner plastics tube, each layer being constituted of a single flat row of filaments arranged in adjoining parallel relation, all the layers having a same number of filaments, the plurality of layers providing plural adjacent layers of filaments extending in the same direction, wherein the filaments of every layer are made of plastics, and wherein, when the hose is straight, the number of filaments per layer is such and each filaments is so deformed in its right cross-section that a gap separating two adjacent layers extending in the same direction as one another is at least 100% filled, each filament having a non-circular flattened cross-section.

2. A hose according to claim 1 wherein each filament has an elliptical right cross-section.

3. A hose according to claim 1, wherein the filaments have a gauge t and are braided with a tension T in N layers of n filaments, and wherein the number n of filaments per layer the number N of layers around the inner tube, the filament gauge t and the tension T with which they are laid are such that when the hose is straight the width E of the gap for a layer of n filaments is less than the space required thereby before being braided, thus satisfying the relation E-nd<0, where d is an average diameter of the filaments before they are braided, the filaments being disposed one beside another, squeezed against one another, each filament being flattened in a direction substantially parallel to a tangential direction of the inner tube.

4. A hose according to claim 1, wherein the inner tube is made of polytetrafluoroethylene.

5. A hose according to claim 1, wherein the filaments are made of synthetic twisted fibers, notably with an $80s$ twist.

6. A hose according to claim 1, wherein the filaments have a diameter from 0.3 to 016 mm and a breaking strength of the order of 280 da $N/mm^2$.

7. A hose according to claim 1, wherein it comprises at least one braiding of filaments and means for protecting the braiding against external stressing including mechanical, heat, chemical and radiation stressing.

8. A hose according to claim 7, wherein said protective means comprise a plastics sheathing.

9. A hose according to claim 7, wherein said protective means comprise an outer protective braiding around the or each braiding.

10. A hose according to claim 9, wherein the outer protective braiding is made of highly abrasion-resistant plastics operative as heat insulant and unaffected by ultraviolet radiation, such as aromatic polyamide.

11. A hose according to claim 7, wherein it comprises only one braiding of filaments and the same are embodied by or covered by a substance treated to withstand stressing to form said protective means.

12. A hose according to claim 1, wherein the filaments of the outer most braiding are embodied by or covered by a non-wetting substance.

13. A hose according to claim 1, wherein it comprises two identical braiding disposed one above another, the braiding angles being very close to one another at 54° and 55° respectively.

14. A hose according to claim 1, wherein the filaments are made of synthetic fibers and wherein the fibers of the filaments are impregnated with a fluorinated polymer operative to provide chemical and mechanical bonding of the b=fibers.

15. A hose according to claim 8, wherein said plastics sheathing is made of synthetic fluorinated polymer, covering the or each braiding.

* * * * *